United States Patent
Lee et al.

(10) Patent No.: US 7,215,869 B2
(45) Date of Patent: May 8, 2007

(54) CANTILEVER-TYPE PLC OPTICAL ATTENUATOR AND MANUFACTURING METHOD THEREOF

(75) Inventors: Sung Jun Lee, Seoul (KR); Yoon Shik Hong, Kyungki-do (KR); Ro Woon Lee, Seoul (KR); Jong Sam Kim, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 251 days.

(21) Appl. No.: 10/911,492

(22) Filed: Aug. 5, 2004

(65) Prior Publication Data

US 2005/0207720 A1   Sep. 22, 2005

(30) Foreign Application Priority Data

Mar. 22, 2004   (KR) ............... 10-2004-0019365

(51) Int. Cl.
 *G02B 6/26* (2006.01)
(52) U.S. Cl. .................... 385/140; 385/40
(58) Field of Classification Search ........ 385/140, 385/40

See application file for complete search history.

(56) References Cited

U.S. PATENT DOCUMENTS

| | | | |
|---|---|---|---|
| 5,261,015 A * | 11/1993 | Glasheen | 385/23 |
| 5,715,337 A * | 2/1998 | Spitzer et al. | 385/4 |
| 6,236,491 B1 | 5/2001 | Goodwin-Johansson | |
| 6,658,176 B2 * | 12/2003 | Amantea | 385/25 |
| 6,836,583 B2 * | 12/2004 | Hsu et al. | 385/25 |
| 6,936,950 B2 * | 8/2005 | Akagawa et al. | 385/18 |
| 2002/0031305 A1 | 3/2002 | Ticknor et al. | |
| 2004/0005135 A1 | 1/2004 | Katayama et al. | |
| 2004/0264847 A1 * | 12/2004 | Koh et al. | 385/22 |

FOREIGN PATENT DOCUMENTS

KR   2003-15886   2/2003

OTHER PUBLICATIONS

Watts et al.; "Electromechanical Optical Switching and Modulation in Micromachined Silicon-on-insulator Waveguides"; 1991; IEEE International SOI Conference Proceedings; Vail Valley, Colo., Oct. 1-3, 1991, pp. 62-63).*
Chinese Patent Office Office Action and English Abstract mailed Aug. 4, 2006.

* cited by examiner

*Primary Examiner*—Frank G. Font
*Assistant Examiner*—James P. Hughes
(74) *Attorney, Agent, or Firm*—Lowe Hauptman & Berner, LLP.

(57) ABSTRACT

Disclosed herein is a cantilever-type PLC optical attenuator. The optical attenuator includes a base substrate made of silicon, an input waveguide, and output waveguide. Front portions of the upper and lower silicon substrates around the output waveguide are thinner than rear portions of the upper and lower silicon substrates around the output waveguide to provide a cantilever part having upper and lower cantilever substrate parts. A first electrode is provided on a bottom of the lower cantilever substrate part, and a second electrode is provided on the base substrate to electromagnetically correspond to the first electrode. When a voltage is applied between the first and second electrodes, the cantilever part moves up and down by an electromagnetic force, thus controlling the output light.

12 Claims, 5 Drawing Sheets

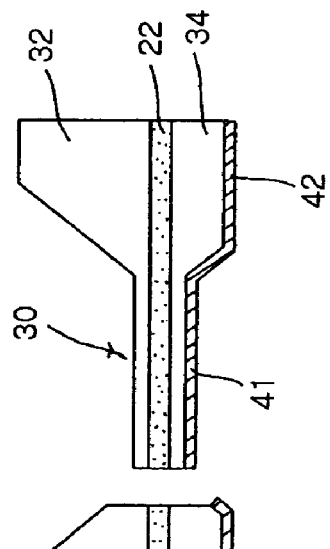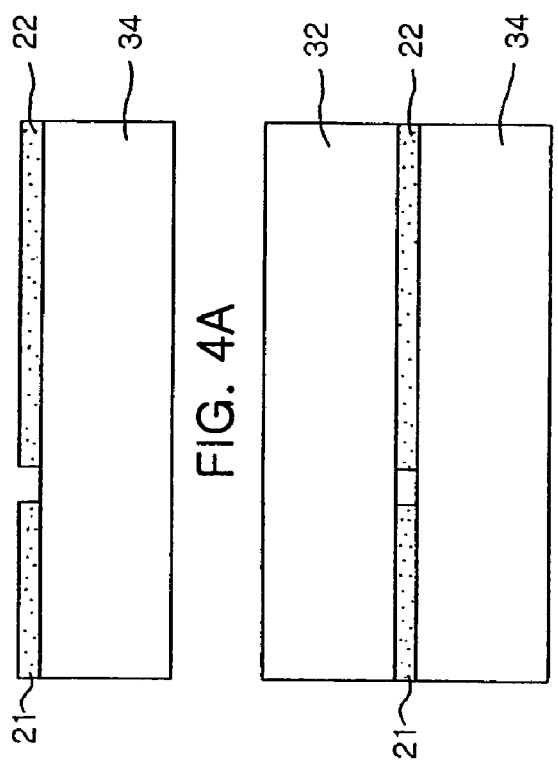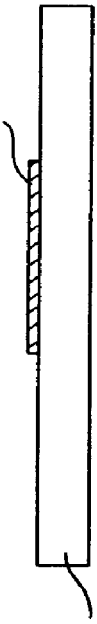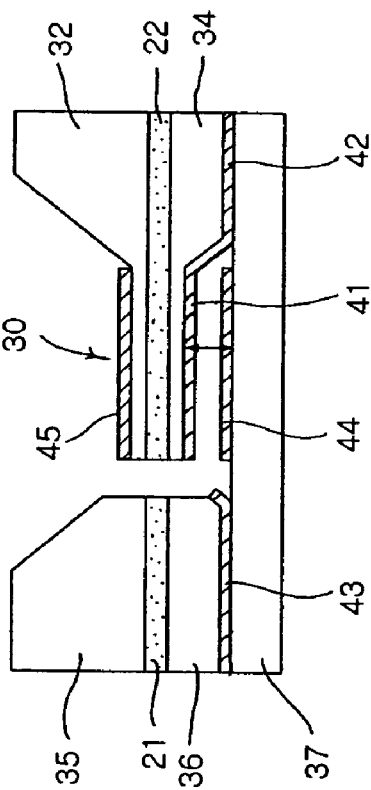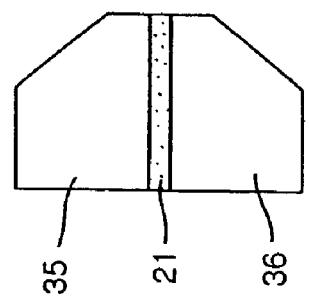

CANTILEVER-TYPE PLC OPTICAL ATTENUATOR AND MANUFACTURING METHOD THEREOF

RELATED APPLICATIONS

The present application is based on, and claims priority from, Korean Application Number 2004-19365, filed Mar. 22, 2004, the disclosure of which is hereby incorporated by reference herein in its entirety.

BACKGROUND OF THE INVENTION

1. Field of the Invention

The present invention relates generally to optical attenuators, and more particularly, to an optical attenuator and a manufacturing method thereof, capable of controlling output light, using a micro electro mechanical system (referred to 'MEMS' hereinafter) technology and an electromagnetic force.

2. Description of the Related Art

Generally, an optical attenuator is an element that reduces an intensity of an optical power received at a receiving end of an optical communication system, thus preventing malfunction of the system.

The combination of a super highway network with a multimedia system, namely, a super highway information telecommunication service is realized on the basis of a wire or wireless super highway broadband communication technology. Particularly, as an important point of the wire technology, research has been conducted on an optical communication technology which deals with the transmission of broadband signals including picture signals as well as aural signals. Components constituting such an optical communication system are divided into active elements to constitute a light transmitting end of the system, and passive elements to control transmitted light in the system. Of the passive elements, a variable optical attenuator (VOA) that variably attenuates optical signals is commonly used.

The methods of attenuating light are classified as follows: 1) a method of attenuating light by inserting a thin-film filter made of metal, such as Cr, between optical fibers to absorb light; 2) a method of attenuating light by spacing optical fibers; 3) a method of attenuating light by splicing optical fibers so that the optical fibers cross each other; and 4) a method of attenuating light by adjusting the curvatures of optical fibers.

Recently, there has been manufactured an optical attenuator which blocks an optical path by driving a structure comprising a shutter or mirror by a micro-actuator, using the MEMS technology to meet a demand for the integration or miniaturization of an element. Further, in order to accomplish a multi-channel system, research has been conducted on applying a method of forming a waveguide using the Planar Lightwave Circuit (PLC) technology and changing a path of light which passes through the waveguide, to an optical attenuator.

FIGS. 1a and 1b are views to show a conventional PLC optical attenuator and operation of the attenuator, respectively.

FIG. 1a is a view to show an initial state of the conventional PLC optical attenuator. In the conventional PLC optical attenuator shown in FIG. 1a, optical waveguides 11, 12, and 13 are provided on a silicon substrate 10 to correspond to the MEMS structure, and the optical waveguides 11, 12, and 13 define a path to transmit optical signals. In the initial state of the optical attenuator, the optical waveguides 11, 12, and 13 are aligned in a row, and the optical signal is transmitted via the optical waveguides 11, 12, and 13.

FIG. 1b is a view to show the operation of the conventional PLC optical attenuator. Referring to FIG. 1b, the optical waveguides 11, 12, and 13 comprise an input waveguide 11, a movable waveguide 12, and an output waveguide 13. In an operated state, the movable waveguide 12 moves to be perpendicular to the optical path, so that an optical power is not fully transmitted from an input terminal to an output terminal. In this case, the optical power transmitted to the output terminal is varied, according to moving extent of the movable waveguide 12 relative to the input and output waveguides 11 and 13. In this way, the optical attenuator can attenuate a power of the optical signal. The movable waveguide 12 is coupled to an actuator (not shown) to be moved by driving the actuator.

When the conventional PLC optical attenuator is changed from the initial state to the operated state, the movable waveguide 12 moves to be perpendicular to the input and output waveguides 11 and 13 while being on a same plane with the input and output waveguides 11 and 13. However, the conventional PLC optical attenuator has a problem in that a space for the movement of the movable waveguide 12 and a space for installing the actuator coupled to the movable waveguide 12 are additionally required, so that a reduction in size of the optical attenuator is restricted. Further, when the conventional PLC optical attenuator is applied to each of multi-channel elements in order to control optical powers of the multi-channel elements having a plurality of optical paths, a larger space is required. Since the movable waveguide 12 is made of silica and arranged on the thin silicon substrate 10, the movable waveguide 12 and the silicon substrate 10 may be undesirably deformed due to a difference in stress between materials of the movable waveguide 12 and the silicon substrate 10. When the elements are deformed due to the difference in stress between the materials of the elements, it is difficult to obtain accurate attenuation characteristics.

SUMMARY OF THE INVENTION

Accordingly, the present invention has been made keeping in mind the above problems occurring in the prior art, and an object of the present invention is to provide a cantilever-type PLC optical attenuator and a manufacturing method thereof, capable of controlling output light using a minimum space.

Another object of the present invention is to provide a cantilever-type PLC optical attenuator and a manufacturing method thereof, capable of preventing deformation of the optical attenuator, due to a difference in stress between optical waveguides that are made of different materials.

In order to accomplish the above object, the present invention provides a cantilever-type PLC optical attenuator, including a base substrate made of silicon, an input waveguide arranged on the base substrate to be provided between upper and lower silicon substrates so that an optical signal is input through the input waveguide, an output waveguide which is arranged on the base substrate to be provided between upper and lower silicon substrates and is positioned in a same plane with the input waveguide to be spaced apart from the input waveguide by a predetermined interval, with front portions of the upper and lower silicon substrates around the output waveguide being thinner than rear portions of the upper and lower silicon substrates around the output waveguide to provide a cantilever part having upper and lower cantilever substrate parts, the output waveguide receiving the optical signal transmitted from the input waveguide, prior to outputting the optical signal to an external element, a first electrode provided on a bottom of the lower cantilever substrate part, and a second electrode provided on the base substrate to electromagnetically correspond to the first electrode, wherein a voltage is applied between the first and second electrodes to move the cantilever part up and down by an electromagnetic force, thus controlling the output light.

The upper cantilever substrate part may have a thickness equal to the lower cantilever substrate part.

The first and second electrodes may be made of metal.

The first electrode may be made of metal, while the second electrode may be made of a magnetic material.

The first electrode may further include an extension part that extends along the lower silicone substrate.

Both the input waveguide and the output waveguide may be made of silica.

Further, a stress compensating element may be provided on a predetermined position of the upper cantilever substrate part. The stress compensating element has a same size and is made of a same material as those of the first electrode.

In order to accomplish the above object, the present invention provides a method of manufacturing a cantilever-type PLC optical attenuator, including forming an input waveguide on a lower silicon substrate and an output waveguide to be spaced apart from the input waveguide by a predetermined interval, attaching an upper silicon substrate to the input and output waveguides, forming a cantilever part so that front portions of the upper and lower silicon substrates provided around the output waveguide are far thinner than rear portions of the upper and lower silicon substrates provided around the output waveguide, by etching the upper and lower silicon substrates, forming a first electrode on a bottom of the cantilever part, forming a second electrode on a base substrate made of silicon, and attaching the base substrate to the lower silicon substrate.

The method further includes polishing the lower silicon substrate to reduce a thickness of the lower silicon substrate.

The method further includes forming a stress compensating element on the cantilever part.

BRIEF DESCRIPTION OF THE DRAWINGS

The above and other objects, features and other advantages of the present invention will be more clearly understood from the following detailed description taken in conjunction with the accompanying drawings, in which:

FIGS. 4a through 4f are views to show manufacturing processes of the cantilever-type PLC optical attenuator of FIG. 2.

DESCRIPTION OF THE PREFERRED EMBODIMENTS

Figure 1A:
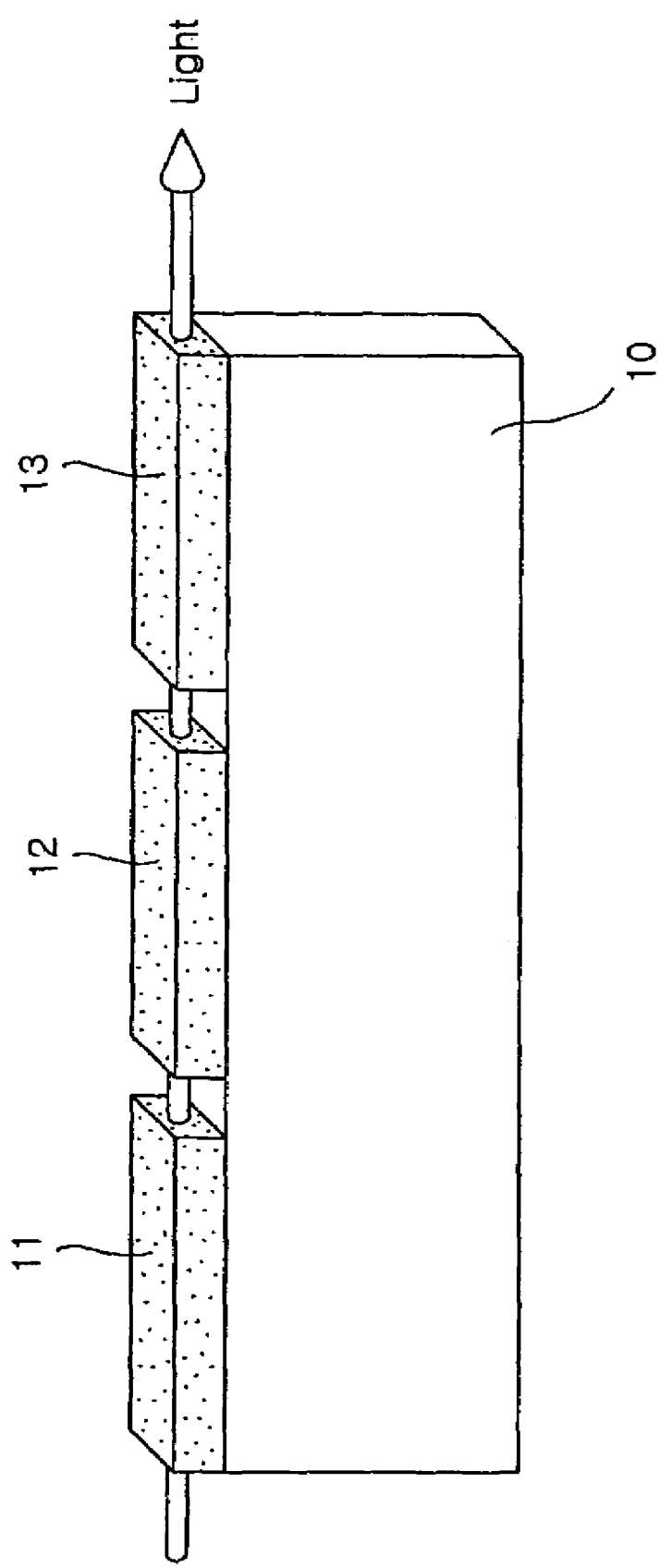
FIGS. 1a and 1b are views to show a conventional PLC optical attenuator and operation of the attenuator, respectively.

Hereinafter, embodiments of the present invention will be described in detail with reference to the attached drawings. Reference now should be made to the drawings, in which the same reference numerals are used throughout the different drawings to designate the same or similar components. In the present specification, if it is determined that a detailed description of related art or construction unnecessarily makes the gist of the present invention unclear, the detailed description thereof will be omitted.

Figure 2:
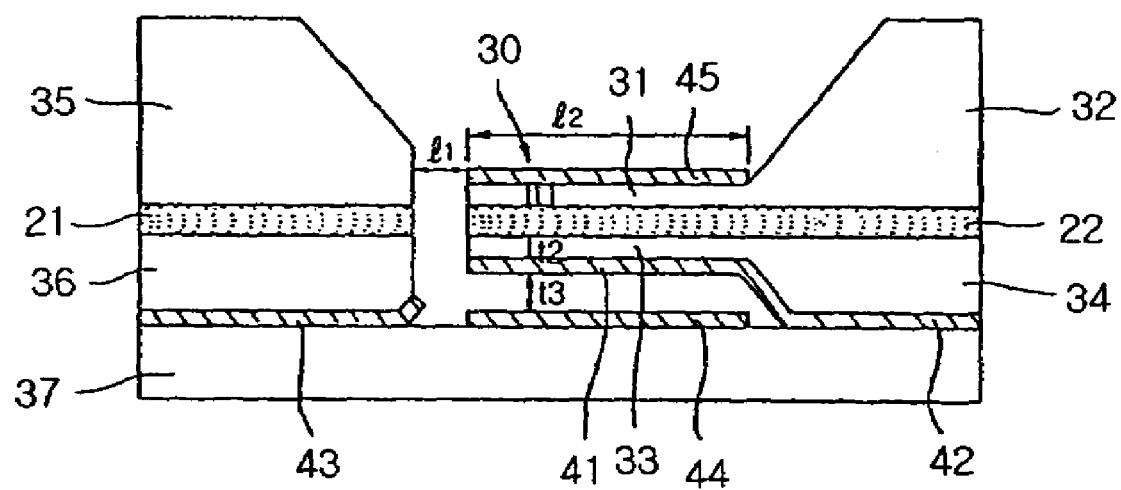
FIG. 2 is a sectional view of a cantilever-type PLC optical attenuator, according to an embodiment of the present invention.

FIG. 2 is a sectional view of a cantilever-type PLC optical attenuator, according to an embodiment of the present invention.

Referring to FIG. 2, the cantilever-type PLC optical attenuator according to the present invention includes an input waveguide 21, an output waveguide 22, a cantilever part 30, upper substrates 32 and 35, lower substrates 34 and 36, a base substrate 37, and first and second electrodes 41 and 44.

The input waveguide 21 is provided between the upper and lower substrates 35 and 36, and the light of a light source is incident on the input waveguide 21. The output waveguide 22 is arranged to be spaced apart from the input waveguide 21 by a predetermined distance 11. Similarly to the input waveguide 21, the output waveguide 22 is provided between the upper and lower substrates 32 and 34. However, the upper and lower substrates 32 and 34 which are respectively placed above and under the output waveguide 22, are formed so that a thickness t1 of a front portion of the upper substrate 32 is less than a thickness of a rear portion of the upper substrate 32, and a thickness t2 of a front portion of the lower substrate 34 is less than a thickness of a rear portion of the lower substrate 34, thus providing the cantilever part 30. That is, in the optical attenuator according to the present invention, the cantilever part 30 includes a front portion of the output waveguide 22 which faces the input waveguide 21, and upper and lower cantilever substrate parts 31 and 33 that are respectively arranged above and under the output waveguide 22. When the cantilever part 30 is forced upwardly or downwardly in a vertical direction, the cantilever part 30 may be easily moved due to the inherent characteristics of the silicon, namely, the elasticity of the silicon. The cantilever part 30 has a predetermined length 12 to move vertically.

The output waveguide 22 is made of silica, but the upper and lower substrates 32 and 34 are made of silicon. The silica and the silicon have different thermal expansion coefficients. Thus, stress is generated between the output waveguide 22 made of the silica and the upper and lower cantilever substrate parts 31 and 33 made of the silicon, thus causing the deformation of the cantilever part 30 of the optical attenuator, and deteriorating an optical power control capacity of the optical attenuator. Thereby, it is preferable that the thickness t1 of the upper cantilever substrate part 31 be equal to the thickness t2 of the lower cantilever substrate part 33, thus compensating for the deformation of the optical attenuator due to the stress.

Further, a stress compensating element 45 may be provided on the upper cantilever substrate part 31 of the cantilever part 30. The stress compensating element 45 has the same size and is made of the same material as those of the first electrode 41. The stress compensating element 45 allows the cantilever part 30 to have a symmetric structure with respect to the output waveguide 22, thus more efficiently compensating for the deformation of the cantilever part 30 due to the stress. The optical attenuator according to the present invention is manufactured to have an optimum structure capable of preventing the deformation of the cantilever part 30, thus obtaining more accurate attenuation characteristics.

The first electrode 41 is provided on a bottom of the lower cantilever substrate part 33 of the cantilever part 30. Further, the second electrode 44 is provided under the first electrode 41. The second electrode 44 is provided on the base substrate 37 which is made of silicon. Both the first and second electrodes 41 and 44 may be made of metal. In this case, when a voltage is applied between the first and second electrodes 41 and 44, an electrostatic force is generated between the first and second electrodes 41 and 44 to move the cantilever part 30 in a vertical direction. Meanwhile, the first electrode 41 may be made of metal, while the second electrode 44 may be made of a magnetic material. In this case, when a voltage is applied to the first electrode 41, a magnetic force is generated between the first and second electrodes 41 and 44 to move the cantilever part 30 in a vertical direction. Conversely, even when the first electrode 41 may be made of the magnetic material and the second electrode 44 may be made of the metal, similar results are obtained.

Therefore, the first and second electrodes 41 and 44 must be spaced apart from each other by a predetermined distance t3 to deform the cantilever part 30 using an electromagnetic force. Further, the first electrode 41 may further include extension parts 42 and 43 that extend along the lower substrates 34 and 36. The extension parts 42 and 43 allow a bias voltage to be easily applied to the first electrode 41, in addition to allowing the lower substrates 34 and 36 to be easily attached to the base substrate 37.

Figure 1B:
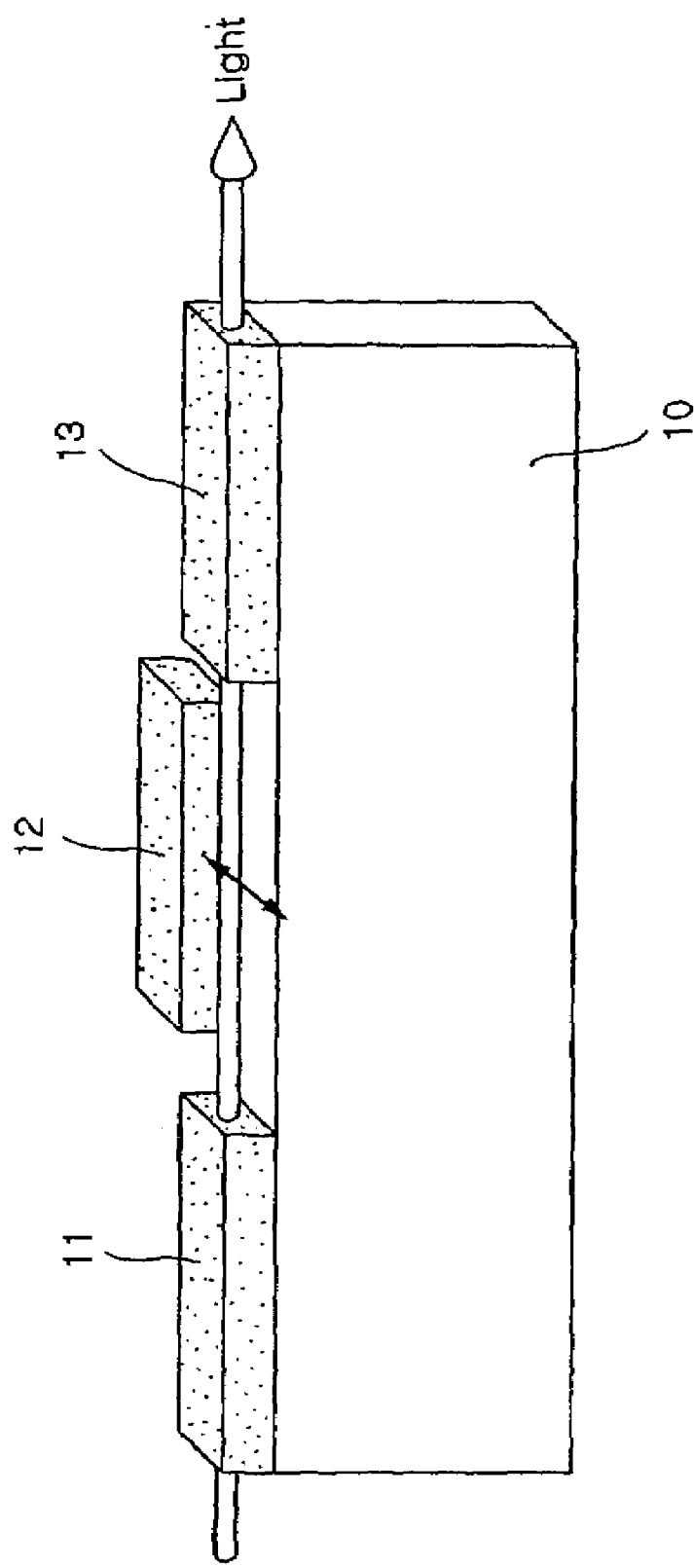

As such, the optical attenuator according to the present invention is constructed to move the cantilever part 30 in a vertical direction using the first and second electrodes 41 and 44 provided under the cantilever part 30, thus realizing an optical attenuating function, even in a small space, therefore remarkably reducing the size of the optical attenuator. Furthermore, the optical attenuator according to the present invention does not need additional spaces for the movable waveguide 12 and the actuator, different from the conventional optical attenuator shown in FIG. 1. Therefore, several optical attenuators according to the present invention are horizontally arranged to be in close contact with each other, thus allowing a multi-channel optical attenuator to be easily realized, even in a small space.

The operation and effects of the cantilever-type PLC optical attenuator, according to the present invention will be described in the following.

Figure 3A:
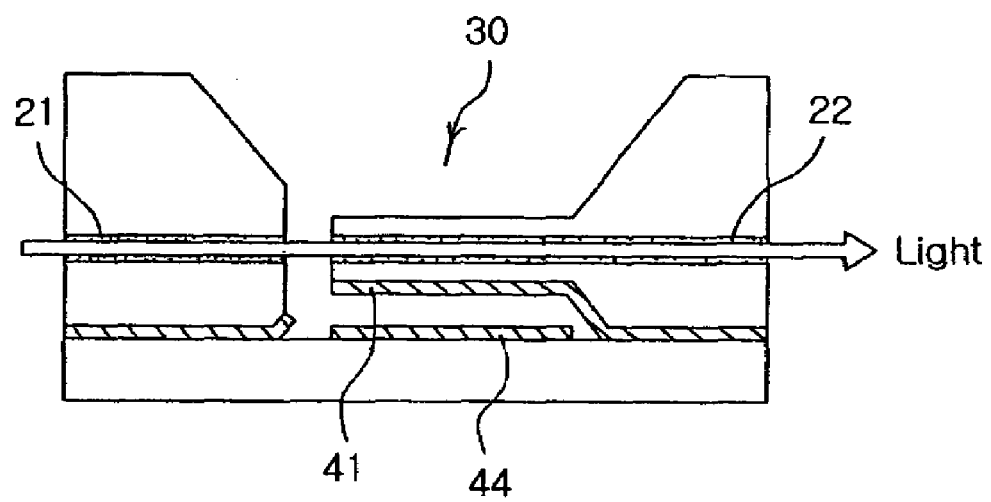
FIGS. 3a and 3b are views to show operation of the cantilever-type PLC optical attenuator of FIG. 2.
Figure 3B:
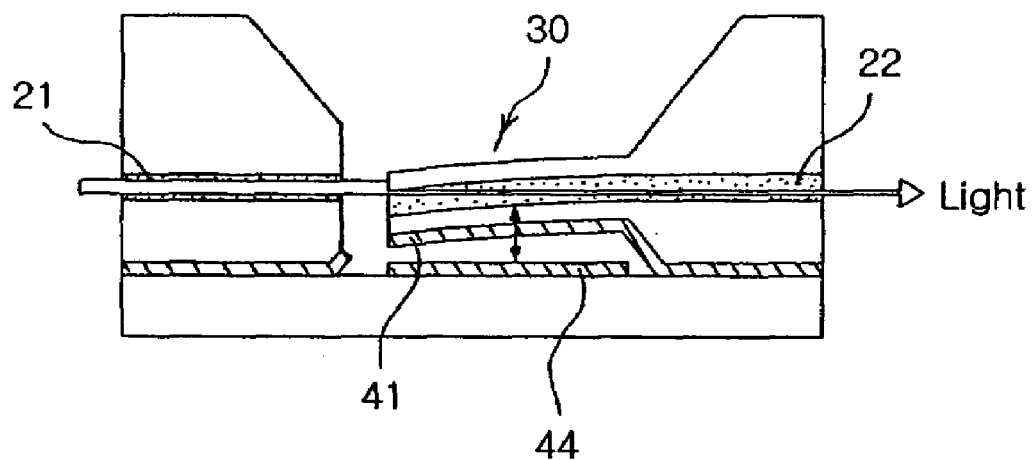

FIGS. 3a and 3b are views to show operation of the cantilever-type PLC optical attenuator, according to an embodiment of the present invention.

FIG. 3a shows an initial state of the cantilever-type PLC optical attenuator, according to this invention. In the optical attenuator of FIG. 3a, an optical signal is input from a light source to the input waveguide 21. Subsequently, the optical signal output from the input waveguide 21 is transmitted to the output waveguide 22, and then is fed to an external element.

FIG. 3b shows the operation of the cantilever-type PLC optical attenuator, according to this invention. When a voltage is applied between the first and second electrodes 41 and 44, an electromagnetic force is generated. By such an electromagnetic force, the cantilever part 30 and the output waveguide 22 are deformed while being moved in a vertical direction. FIG. 3b shows the case where an attractive force acts between the first and second electrodes 41 and 44, and the cantilever part 30 moves downwardly in a vertical direction. However, different from the case shown in FIG. 3b, the cantilever part 30 may move upwardly in a vertical direction. At first, the input waveguide 21 and the output waveguide 22 are placed in a same horizontal plane. After the movement of the cantilever part 30, the input waveguide 21 and the output waveguide 22 are offset from each other, thus narrowing an optical path. When the optical path becomes narrow, an optical power of the optical signal transmitted from the input waveguide 21 to the output waveguide 22 is reduced in proportional to the narrowed optical path. The moving extent of the cantilever part 30 may be controlled by varying a voltage applied between the first and second electrodes 41 and 44 or the distance t3 between the first and second electrodes 41 and 44. In this way, the optical attenuator can control an optical power that is output from the output waveguide 22, using the electromagnetic force generated between the first and second electrodes 41 and 44.

FIGS. 4a through 4f are views to show manufacturing processes of the cantilever-type PLC optical attenuator, according to an embodiment of the present invention.

Referring to FIG. 4a, in order to manufacture the optical attenuator of this invention, the lower substrate 34 made of silicon is prepared, and then the input waveguide 21 is formed, using silica, on the lower substrate 34. The output waveguide 22 is formed, using silica, at a position spaced apart from the input waveguide 21 by a predetermined distance.

Subsequently, as shown in FIG. 4b, the upper substrate 32 is attached to upper surfaces of the input and out waveguides 21 and 22. Thus, the input and output waveguides 21 and 22 are sandwiched between the upper and lower substrates 32 and 34.

Next, as shown in FIG. 4c, the upper and lower substrates 32 and 34 are etched, so that the cantilever part 30 is formed at a position where the input and output waveguides 21 and 22 face each other, to separate the input waveguide 21 from the output waveguide 22. In this case, the cantilever part 30 is constructed so that the upper and lower cantilever substrate parts 31 and 33, which are respectively placed above and under the front portion of the output waveguide 22, are far thinner than the upper and lower substrates 32 and 34, which are respectively placed above and under the rear portion of the output waveguide 22.

Further, the lower substrates 34 and 36 may be thinly processed through a chemical mechanical polishing (CMP), in order to form the first electrode 41 later on. However, from the beginning, it is possible to use the lower substrates 34 and 36 which are thinner than the upper substrates 32 and 35.

Thereafter, as shown in FIG. 4d, the first electrode 41 is formed on a lower portion of the cantilever part 30. Further, the extension parts 42 and 43 may be provided along the lower substrates 34 and 36.

Next, as shown in FIG. 4e, the second electrode 44 is provided on the base substrate 37 made of silicon.

In order to control the output light by moving the cantilever part 30 using an electrostatic force, the first and second electrodes 41 and 44 may be made of metal. Further, in order to control the output light by moving the cantilever part 30 using a magnetic force, the first electrode 41 is made of metal, while the second electrode 44 is made of a magnetic material.

Finally, as shown in FIG. 4f, the lower substrates 34 and 36 are attached to the base substrate 37. Further, the stress compensating element 45 that has the same size and material as those of the first electrode 41 may be provided on the cantilever part 30.

Through the above-mentioned processes, the cantilever-type PLC optical attenuator, which uses a minimum space and accomplishes accurate attenuation characteristics, can be obtained.

As described above, the present invention provides a cantilever-type PLC optical attenuator, which is constructed so that a cantilever part moves up and down to attenuate light, and electrodes are directly formed on the cantilever part, thus reducing a space required for the optical attenuator for a channel. Thus, miniaturization of the optical attenuator is accomplished, and besides, a multi-channel optical attenuator is easily achieved.

Further, according to the present invention, silicon constituting the cantilever part has elasticity, thus increasing drive displacement, and thereby having excellent control capacity of output light.

Furthermore, according to the present invention, silicon having the equal thickness covers upper and lower portions of silica constituting waveguides to provide a sandwich structure, thus compensating deformation due to stress caused by a difference in thermal expansion coefficients between the silica and the silicon, therefore obtaining accurate attenuating characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cantilever-type PLC optical attenuator, capable of controlling output light by attenuating an intensity of input light, comprising:
    a base substrate made of silicon;
    an input waveguide arranged on the base substrate to be provided between upper and lower silicon substrates so that an optical signal is input through the input waveguide;
    an output waveguide arranged on the base substrate to be provided between upper and lower silicon substrates, and positioned in a same plane with the input waveguide to be spaced apart from the input waveguide by a predetermined interval, with front portions of the upper and lower silicon substrates around the output waveguide being thinner than rear portions of the upper and lower silicon substrates around the output waveguide to provide a cantilever part having upper and lower cantilever substrate parts, the output waveguide receiving the optical signal transmitted from the input waveguide, prior to outputting the optical signal to an external element;
    a first electrode provided on a bottom of the lower cantilever substrate part; and
    a second electrode provided on the base substrate to electromagnetically correspond to the first electrode;
    wherein the cantilever part is configured to be moved up and down by a electromagnetic force occurring when a voltage is applied between the first and second electrodes, thus controlling the output light; and
    wherein the upper cantilever substrate part has a thickness equal to the lower cantilever substrate part.

2. The cantilever-type PLC optical attenuator according to claim 1, wherein the first and second electrodes are made of metal.

3. The cantilever-type PLC optical attenuator according to claim 1, wherein the first electrode is made of metal, and the second electrode is made of a magnetic material.

4. The cantilever-type PLC optical attenuator according to claim 1, wherein the first electrode further comprises an extension part that extends along the lower silicon substrate.

5. The cantilever-type PLC optical attenuator according to claim 1, wherein both the input waveguide and the output waveguide are made of silica.

6. The cantilever-type PLC optical attenuator according to claim 1, further comprising: a stress compensating element provided on a predetermined position of the upper cantilever substrate part, the stress compensating element having a same size and made of a same material as those of the first electrode.

7. A method of manufacturing a cantilever-type PLC optical attenuator, comprising:
    forming an input waveguide on a lower silicon substrate, and an output waveguide to be spaced apart from the input waveguide by a predetermined interval;
    attaching an upper silicon substrate to the input and output waveguides, the upper silicon substrate comprising a thickness equal to a thickness of the lower silicon substrate;
    forming a cantilever part so that front portions of the upper and lower silicon substrates provided around the output waveguide are thinner than rear portions of the upper and lower silicon substrates provided around the output waveguide, by etching the upper and lower silicon substrates;
    forming a first electrode on a bottom of the cantilever part;
    forming a second electrode on a base substrate made of silicon; and
    attaching the base substrate to the lower silicon substrate.

8. The method according to claim 7, further comprising: polishing the lower silicon substrate to reduce a thickness of the lower silicon substrate.

9. The method according to claim 7, further comprising: forming a stress compensating element on the cantilever part.

10. The method according to claim 7, wherein the first and second electrodes are made of metal.

11. The method according to claim 7, wherein the first electrode is made of metal, and the second electrode is made of a magnetic material.

12. The method according to claim 7, wherein the input waveguide and the output waveguide are made of silica.

* * * * *